Dec. 24, 1968   C. O. OLDENKOTT   3,417,802
CAPTIVE LOCK WASHER ASSEMBLY
Original Filed July 29, 1966
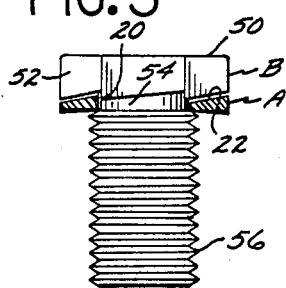
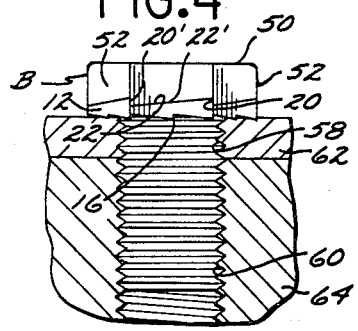
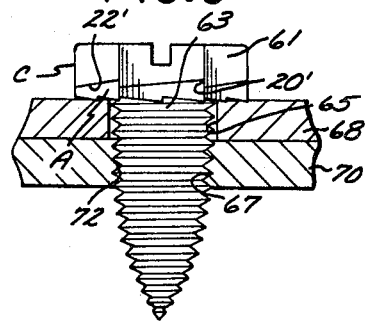
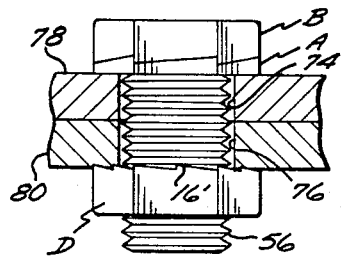
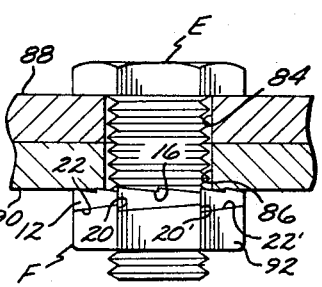
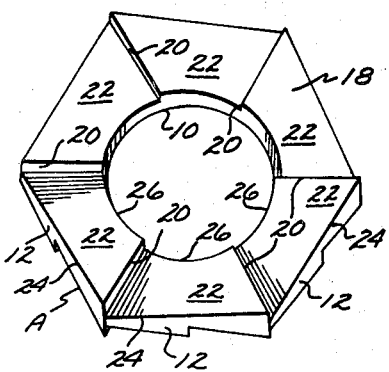
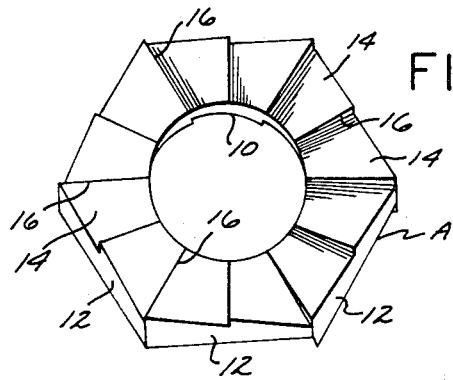
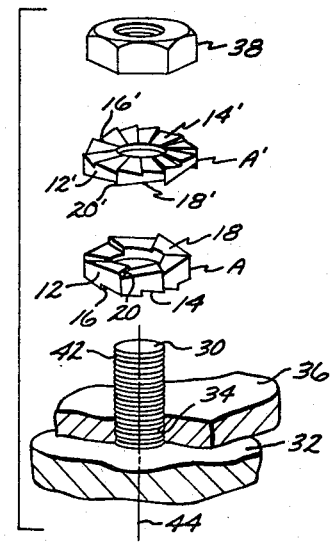
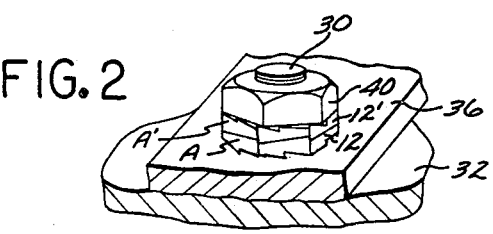
INVENTOR.
CARL O. OLDENKOTT
BY
William C. Babcock
ATTORNEY

United States Patent Office 3,417,802
Patented Dec. 24, 1968

3,417,802
CAPTIVE LOCK WASHER ASSEMBLY
Carl O. Oldenkott, 213 N. Evergreen,
Anaheim, Calif. 92805
Continuation of application Ser. No. 568,842, July 29, 1966. This application Nov. 16, 1967, Ser. No. 683,736
3 Claims. (Cl. 151—37)

ABSTRACT OF THE DISCLOSURE

A fastener assembly for holding first and second elements together including a bolt member having an enlarged head and a threaded shank with a lock washer being captively mounted on the shank adjacent the head and being free for rotatable and limited axial movement thereon. The underside of the bolt head and the adjacent face of the washer are formed with complementary configurations cooperating to lock the bolt against unintentional rotation relative to the first and second elements.

---

The present invention relates generally to the field of mechanical fasteners, and more particularly to a lock washer and lock washer assembly for holding a nut, bolt or screw in a non-rotatable position relative to a member supporting the same.

This application is a continuation of my application Ser. No. 568,842 entitled Captive Lock Washer Assembly, filed July 29, 1966, now abandoned, which application was a continuation-in-part of my application Ser. No. 509,972 entitled, Lock Washer and Lock Washer Assembly, which was filed in the U.S. Patent Office on Nov. 26, 1965, now abandoned, which application was a continuation-in-part of my prior application entitled, Lock Washer and Lock Washer Assembly, filed Mar. 1, 1963, under Ser. No. 261,954, now abandoned.

A major object of the present invention is to provide a lock washer of simple design which, together with another washer of the same design, or in conjunction with a bolt or screw having a head of special design, or in conjunction with a nut of special design, can be utilized to hold a threaded member in a fixed position relative to a member supporting the same.

Another object of the invention is to provide an extremely thin lock washer which entails the use of a minimum amount of metal in the fabrication thereof, but one having the same transverse across section and shape as the bolt head, screw head, or nut with which it is used to permit the bolt head, screw head, or nut to be concurrently engaged with the washer by a wrench, which arrangement is of material assistance in placing the washer in a locking position or removing it therefrom.

Yet another object of the invention is to supply a lock washer that may be movably supported on a bolt or screw adjacent the head thereof, with the threads on the bolt or screw preventing inadvertent displacement of the washer therefrom.

Still a further object of the invention is to furnish a lock washer, bolt or screw assembly which is inexpensive, simple and easy to use, will not shake loose from a supporting member, even when subjected to intense vibration, yet which can be sold at a sufficiently low price as to encourage the widespread use thereof in such diverse fields as automotive manufacture, various types of power-driven saws, looms, presses, and on foundation bolts for engines, motors, or the like.

These and other objects and advantages of the invention will become apparent from the following description thereof and from the accompanying drawing illustrating the same, in which:

FIGURE 1 is an exploded perspective view of a stud bolt, a conventional nut, and two of the lock washers used in holding the nut in a fixed non-rotatable position on the bolt;

FIGURE 2 is a perspective view of the stud bolt, washers and nut shown in FIGURE 1 after the nut and washers have been disposed in positions thereon wherein the washers cooperatively hold the nut in a fixed position relative to the stud bolt;

FIGURE 3 is a side elevational view of a bolt and lock washer assembly;

FIGURE 4 is a combined side elevational and longitudinal cross-sectional view of a bolt and washer assembly shown in FIGURE 3 disposed in a fixed position relative to two supporting members;

FIGURE 5 is a combined side elevational and vertical cross-sectional view of a screw and lock washer assembly disposed in a fixed position relative to two supporting members;

FIGURE 6 is a combined side elevational and vertical cross-sectional view of a special bolt and nut held in fixed positions relative to at least one supporting member by one of the lock washers;

FIGURE 7 is a combined side elevational and vertical cross-sectional view of a special bolt and nut held in a fixed position relative to at least one supporting members by one of the lock washers;

FIGURE 8 is a perspective view of one of the lock washers illustrating in detail a first end face thereof on which a number of serrations are formed; and FIGURE 9 is a second perspective view of one of the lock washers illustrating in detail a second end face thereof on which a number of inclined surfaces are defined which are adapted to mate with duplicate inclined surfaces provided on either the head of a bolt, a nut, or a second lock washer.

With particular references to FIGURES 8 and 9 of the drawing for the detailed structure of one of the lock washers A, it will be seen to be formed from a single piece of metal in which a central opening 10 is formed, and is provided with a number of pairs of flat, angularly disposed wrench engageable side surfaces 12. On a second end face 14 of washer A a number of radially extending serrations 16 are defined.

On a first end face 18 of lock washer A a number of circumferentially spaced, radially extending shoulders 20 are formed, which are of uniform height. A plurality of inclined surfaces 22 are defined on the second end face 18, with each surface 22 sloping circumferentially from the outer edge of one of the shoulders 20 to the inner edge of a shoulder adjacent thereto. Each surface 22 also slopes radially and inwardly from an edge 25 thereof to an edge 26, which latter is arcuate and partially defines the opening 10. Each surface 22 is generally trapezoidal in shape, but is not a true trapezoid for the edges 24 and 26 thereof are not parallel.

In FIGURES 1 and 2 a stud bolt 30 is shown that projects upwardly from a first rigid member 32 through a bore 34 provided in a second member 36. A nut 38 engages bolt 30, and this nut may be held in a fixed position on the bolt by placing the lock washer A on the bolt with the serrations 16 thereof in abutting contact with the upper surface of member 36.

A second lock washer A′ is provided, as shown in FIGURES 1 and 2 that is of the same general structure as lock washer A, and includes surfaces 22′ which are complementary to surfaces 22. The same numerals are used in identifying structural features of lock washer A′ as as used with washer A, but to which primes have been added (FIGURE 1).

The lock washer A′ is mounted on bolt 30, as shown in FIGURE 2, with the identical inclined surfaces 22 and and 22' in abutting contact.

The nut 38 is then threaded onto bolt 30. The nut 38 is of the same transverse cross section and shape as the lock washers A and A'. Nut 38 also has a number of flat, angularly disposed external surfaces 40 that are in co-planar alignment with external surfaces 12 and 12' of washers A and A' to permit the nut and washers to be gripped as a unit by a wrench (not shown) in mounting the washers and nut on the bolt 30 or removing them therefrom.

Threads 42 are provided on bolt 30 that are at an angle relative to the longitudinal axis 44 of the bolt, which is less than that of the edges 26 and 26'. The serrations 16 and 16' are harder than the materials defining the nut 40 and member 36 with which they come in contact. When the nut 40 is tightened on bolt 30, sufficient force is exerted on serrations 16 and 16' as to cause them to bite into the materials defining the lower surface of nut 38 and the upper surface of member 36. The serrations 16' are preferably so barbed (FIGURE 2), that they become further embedded in the metal surface of nut 38 when the nut tends to rotate in a counter clockwise direction relative to the bolt 30. Serrations 16 are also so shaped that they tend to become further embedded in the metal of member 36 when the washer A tends to rotate relative thereto.

Thus, if the nut 40 shown in FIGURE 2 tends to rotate in a counter clockwise direction to loosen bolt 30, the washer A' tends to rotate therewith, with the inclined surfaces 22 moving relative to surfaces 22' and binding therewith. From the above description of the operation of the washers A and A', it will be seen that only those portions of the surfaces 22 and 22' adjacent the edges 26 and 26' need be at an angle relative to the longitudinal axis 44 which is greater than that of the threads 42. Accordingly, the washers A and A' may be relatively thin, requiring a minimum of stock in the fabrication thereof.

If the bolt 30, washers A and A' and nut 38 are to be subjected to a substantially elevated temperature, it obviously would be desirable that the material from which the lock washers are fabricated have substantially the same coefficient of expansion as that of the threaded bolt 30 on which they are mounted to prevent disengagement of the nut 38 therefrom. Also, if the threaded bolt 30 is heavily stressed to the extent that the metal thereof will "creep" over a period of time, the serrations 16 must dig into the member 36 and nut 38 to depths wherein they will not be disengaged therefrom as the bolt elongates.

Although a pair of lock washers A and A' operates most satisfactorily for the purpose described herein, the same result may be attained by the use of a single lock washer A in combination with bolts, screws and nuts as illustrated in FIGURES 3–7 of the drawing.

In FIGURES 3 and 4, a bolt B is shown that is provided with a head 50 of the same transverse size and shape as washer A. Head 50 includes the same number of flat, angularly disposed side surfaces 52 as the number of such flat surfaces 12 provided on the washer A. A shank 54 projects outwardly from the center of a first face of head 50, and this face has duplicate shoulders 20' and inclined surfaces 22' defined thereon which mate with shoulders 20 and surfaces 22 of the lock washer A when the latter is mounted on the shank.

Shank 54 is of such transverse cross section that while it snugly engages opening 10 of lock washer A, it permits slidable and rotational movement of the washer thereon. The external diameter of the threads 56 is greater than that of the opening 10 whereby the washer A is held on the bolt B. Threads 56 are rolled on the outer portion of shank 54 after the washer A is mounted thereon, and disposed adjacent head 50. Threads 56 are spaced outwardly from head 50 a distance sufficient to permit washer A to rotate and slide relative to shank 54.

The external surfaces 52 and 12 may then be concurrently engaged by a wrench (not shown) to dispose the bolt B in a locked position in aligned bores 58 and 60 in two members 62 and 64 respectively. The bore 60 must, of course, be tapped, and when the bolt B is in a locked position the serrations 16 dig into the upper surface of the member 58 to prevent counter clockwise rotation of washer A relative thereto. When bolt B tends to rotate in a counter clockwise direction relative to members 58 and 60 (FIGURE 4), the surfaces 22 and 22' bind, whereby the bolt is held in a locked position on these members.

In the form of the invention shown in FIGURES 3 and 4, the function of the lock washer A' is carried out by the bolt head 50 on which the shoulders 20' and inclined surfaces 22' are defined. This form of the invention provides the advantage of an integral unit that is simple and easy to handle and one which eliminates the possibility of mis-matching the washer A relative to the head 50 of bolt B.

The form of the invention shown in FIGURE 5 is similar to that shown in FIGURES 3 and 4, but differs therefrom in that the washer A is mounted on a screw C rather than the bolt B. The screw C includes a slotted head 61, on one face of which are formed shoulders 20' and inclined surfaces 22' that are duplicates of shoulders 20 and surfaces 22 of washer A. Screw C has an externally threaded, tapered shank 63 that supports the washer A in the same manner as shank 54. The shank 63 extends through two aligned bores 65 and 67 in two members 68 and 70, as shown in FIGURE 5, to engage threads 72 formed in the lowermost bore.

In both forms of the invention illustrated in FIGURES 3–6, at least portions of the inclined surfaces 22 must be at an angle relative to the longitudinal axis of the bolt B or screw C which is greater than the pitch of the threads defined thereon for the same reasons given in connection with that form of the invention shown in FIGURES 1, 2, 8 and 9.

In FIGURE 6 the bolt B illustrated in FIGURES 3 and 4 is shown in use as a through bolt, with the shank 54 thereof extending through aligned bores 74 and 76 in two members 78 and 80, respectively, to secure the members together. Threads 56 on the looser end of shank 54 are engaged by a nut D having serrations 16' formed on a first face thereof. The serrations 16' dig into the lower surface 82 of member 80 when the nut D is tightened on threads 56, and prevent rotation of the nut on the shank 54. The lock washer A and head 50 cooperatively prevent rotation of bolt B relative to members 78 and 80 for the reasons previously described in connection with that form of the invention shown in FIGURES 3 and 4.

A conventional bolt E is shown in FIGURE 7 as extending through two aligned bores 84 and 86 in two members 88 and 90, and held in a locked position by one of the washers A and a nut F. The nut F is provided with duplicate shoulders 20' and inclined surfaces 22' on an end face thereof which mate with shoulders 20 and surfaces 22 on nut A. Nut F is of the same transverse cross section and shape as washer A, and has a number of flat, angularly disposed side surfaces 92 that are in alignment with surfaces 12 of nut A. Accordingly, nut F and washer A can be gripped concurrently by a wrench (not shown) to place them in the position on bolt E shown in FIGURE 7.

When the nut F and washer A are tightened on bolt E (FIGURE 7), serrations 16 dig into the lower surface of member 90. Nut F cannot then turn in a counter clockwise direction relative to bolt E, for as soon as such action begins, the inclined surfaces 22 and 22' bind on one another in the same manner described in connection with that form of the invention shown in FIGURES 3 and 4.

From the above description of the inventions shown in FIGURES 3–7 inclusive, it will be seen that the various bolt, screw and nut arrangements with a single lock washer A occupy a minimum of space due to the thinness of the lock washer.

The washer A is preferably formed from a low carbon steel such as 1010 or 1018. Each washer is formed by sequentially subjecting a slug of steel to pressure to shape it into the configuration shown in FIGURE 1. After each washer A is so formed, it is subjected to heat treatment and a cyaniding operation to introduce both carbon and nitrogen into the steel thereof. The nitrogen is concentrated on the exterior surface of the steel washer, since nitrogen does not diffuse so rapidly in steel as carbon.

The heat-treated washer can be considered as one having predominantly or largely nitride on the exterior surfaces thereof, which merges into, and is backed up by a carbide case. Thus, it will be seen that the washer A includes a resilient central core, a transition zone of higher carbon content, and a hard exterior layer of iron nitride. Such a washer is highly wear resistant, but will not crack or be damaged should uneven compressive forces be applied thereto. After being so heat-treated, the washers A can be plated with a suitable metal, nickel, cadmium, or the like, depending on the environment in which it is to be used.

The use of all forms of the invention has been described in detail herein, and need not be repeated.

Although the present invention is fully capable of achieving the objects and providing the advantages hereinbefore mentioned, it is to be understood that it is merely illustrative of the presently preferred embodiments thereof, and I do not mean to be limited to the details of construction herein shown and described, other than as defined in the appended claims.

I claim:

1. A fastener assembly for holding first and second elements together when a first opening in said first element is in alignment with a second opening in said second element which second opening has threads formed therein, said fastener assembly being of the type that includes a bolt provided with a head having a plurality of pairs of wrench-engageable, angularly disposed external side surfaces, a shank of circular transverse cross section projecting outwardly from a first end face of said head, and a lock washer having a central opening formed therein which is slidably and rotatably mounted on a first longitudinal portion of said shank adjacent said head, which washer is of the same transverse cross section as said head and has the same number of pairs of wrench-engageable, angularly disposed side surfaces as said head, said assembly being characterized by:

(a) a plurality of threads defined on a second portion of said shank outwardly from said first potrion, the diameter of which threads is greater than that of said central opening in said washer but less than the diameter of said first opening, with said threads being of a size to engage said threads in said second opening to permit said bolt to hold said first element on said second element, and said threads and head to serve as stops to prevent displacement of said washer from said shank;

(b) a plurality of circumferentially spaced, radially extending rectangular body shoulders defined on a first end face of said washer, which end face is disposed adjacent to said first end face of said head, and the number of said body shoulders are at least as great as the number of said wrench-engageable surfaces on said washers;

(c) a plurality of inclined surfaces defined on said first face of said washer, each of which inclined surfaces slope circumferentially from the top of one of said body shoulders to the bottom of one of said body shoulders adjacent thereto, with each of said inclined surfaces sloping radially from an outermost portion of said washer to a portion of an edge that defines said central opening in said washer, with the edge of each of said inclined surfaces adjacent said central opening in said washer forming an angle relative to a plane at right angles to a central axis of said shank that is greater than the angle of said threads on said shank relative to said axis;

(d) a plurality of body shoulders and inclined surfaces defined on said first face of said head that are complementary to said shoulders and inclined surfaces on said first face of said washer and in full contact therewith when said bolt is tightened in said threads of said second opening by said pairs of wrench-engageable surfaces on said head and washer when concurrently gripped by a wrench and said head, shank, and washer are rotated in a first direction; and (e) a plurality of circumferentially spaced serrations on a second end face of said washer that are harder than the material defining said first element and are at least partially embedded in said material when said bolt is tightened in said second opening with said serrations serving at all times to hold said washer in a nonrotatable position relative to said first element, with said bolt being incapable of rotating in a second direction to unscrew from said second opening due to said inclined surfaces on said first faces of said head and washer binding on one another when such rotation of said bolt in said second direction starts to occur.

2. A fastener as defined in claim 1 wherein the outer part of said second portion of said shank is of tapered configuration.

3. A fastener assembly for holding first and second elements together when a first opening in said first element is in alignment with a second opening in said second element which second opening has threads formed therein, said fastener assembly being of the type that includes a bolt provided with a head having a plurality of pairs of wrench-engageable, angularly disposed external side surfaces, a shank of circular transverse cross section projecting outwardly from a first end face of said head, and a lock washer having a central opening formed therein which is slidably and rotatably mounted on a first longitudinal portion of said shank adjacent said head, which washer is of substantially the same transverse cross section as said head and has the same number of pairs of wrench-engageable, angularly disposed side surfaces as said head, said assembly being characterized by:

(a) a plurality of threads defined on a second portion of said shank outwardly from said first portion, the diameter of which threads is greater than that of said central opening in said washer but less than the diameter of said first opening, with said threads being of a size to engage said threads in said second opening to permit said bolt to hold said first element on said second element, and said threads and head to serve as stops to prevent displacement of said washer from said shank;

(b) a plurality of circumferentially spaced, radially extending rectangular body shoulders defined on a first end face of said washer, which end face is disposed adjacent to said first end face of said head, and the number of said body shoulders are at least as great as the number of said wrench-engageable surfaces on said washers;

(c) a plurality of inclined surfaces defined on said first face of said washer, each of which inclined surfaces slope circumferentially from the top of one of said body shoulders to the bottom of one of said body shoulders adjacent thereto, with the edge of each of said inclined surfaces adjacent said central opening in said washer forming an angle relative to a plane at right angles to a central axis of said shank that is greater than the angle of said threads on said shank relative to said axis;

(d) a plurality of body shoulders and inclined surfaces defined on said first face of said head that are complementary to said shoulders and inclined surfaces on said first face of said washer and in full contact therewith when said bolt is tightened in said threads of said second opening by said pairs of wrench-engageable surfaces on said head and washer when concurrently gripped by a wrench and said head, shank, and washer are rotated in a first direction; and (e) a plurality of circumferentially spaced serrations on a second end face of said washer that are harder than the material defining said first element and are at least partially embedded in said material when said bolt is tightened in said second opening, with said serrations serving at all times to hold said washer in a nonrotatable position relative to said first element, with said bolt being incapable of rotating in a second direction to unscrew from said second opening due to said inclined surfaces on said first faces of said head and washer binding on one another when such rotation of said bolt in said second direction starts to occur.

References Cited

UNITED STATES PATENTS

| | | | |
|---|---|---|---|
| 782,467 | 2/1905 | Replogle | 85—1 |
| 1,107,792 | 8/1914 | Houston | 151—35 |
| 2,271,732 | 2/1942 | Chappuis | 151—35 |
| 2,783,810 | 3/1957 | Wrigley | 151—34 |
| 3,241,589 | 3/1966 | Enders | 151—34 |

FOREIGN PATENTS

| | | |
|---|---|---|
| 684,466 | 11/1939 | Germany. |
| 1,361 | 1/1890 | Great Britain. |
| 514,923 | 11/1939 | Great Britain. |
| 910,258 | 11/1962 | Great Britain. |

CARL W. TOMLIN, *Primary Examiner.*

RAMON S. BRITTS, *Assistant Examiner.*